Patented July 14, 1931

1,814,393

UNITED STATES PATENT OFFICE

FRANK S. LOW, OF NIAGARA FALLS, NEW YORK, ASSIGNOR, BY MESNE ASSIGNMENTS, TO FRANK S. LOW, OF NIAGARA FALLS, NEW YORK, AND A. W. BERRESFORD, OF DETROIT, MICHIGAN

CHLORINATION OF FERROCHROME

No Drawing.   Application filed January 7, 1929.   Serial No. 330,974.

This invention relates to improvements in the chlorination of ferrochrome, and comprises a process in which ferrochrome is chlorinated in a fused bath of ferrous and chromous chlorides.

According to the present invention, I form a fused bath of ferrous and chromous chlorides and maintain this bath above its fusion temperature and subject ferrochrome while in or admixed with such bath to chlorination by a regulated current of gaseous chlorin to produce additional chromous and ferrous chlorides. When ferrochrome is so chlorinated in the presence of a fused bath of ferrous and chromous chlorides, the ferrochrome can be chlorinated without any considerable amount of chlorination of the ferrous and chromous chlorides to ferric and chromic chlorides. Apparently the ferrochrome serves as a reducing agent to reduce any ferric or chromic chlorides if formed, or combines with the chlorine more readily than the ferrous and chromous chlorides, preventing their further chlorination so long as ferrochrome is present in excess. As a result, with a regulated stream of chlorin so long as unattacked ferrochrome is present in the bath, the bath will continue to be made up mainly or entirely of the ferrous or chromous chlorides. The bath is therefore made up of the primary products formed by the chlorination of the ferrochrome and may advantageously be produced in the first instance by the chlorination of ferrochrome at a sufficiently high temperature to insure fusion of the chlorides produced.

The process can be carried out with successive charges or batches of the fused chlorides and ferrochrome, or the process can be made more or less continuous by further additions of ferrochrome and withdrawal of the excess ferrous and chromous chlorides.

Commercial ferrochrome, and particularly the cheaper grades, contains considerable carbon. This carbon may interfere with the process unless provision is made for agitating the mixture or insuring that the particles of ferrochrome come into intimate contact with the chlorine. Ferrochrome in the form of a more or less fine powder can be more readily chlorinated than ferrochome in the form of lumps, unless provision is made for subjecting the lumps to agitation or attrition to remove carbon from the outer surfaces of the lumps as the chlorination progressively takes place.

The chlorination of ferrochrome is exothermic and supplies considerable heat to the process. Accordingly, it is only necessary to heat the reaction mixture initially to start the reaction. Where a fused bath is employed, it is initially heated to a temperature which will bring about fusion. But where ferrochrome is employed, it is heated to a temperature at which it will be chlorinated and at which the ferrous and chromous chlorides resulting from the chlorination will remain in the form of a fused bath. Temperatures around 800° C. or higher are suitable for use in the process.

The present process results in the production of a mixture of ferrous and chromous chlorides which can be produced substantially free from other chlorides and which can be subsequently treated, if desired, for the production of other products therefrom. The mixture of ferrous and chromous chlorides can, however, if desired, be employed as the final product of the process and drawn off and solidified and the solidified products subsequently granulated or pulverized, or the granulation may be effected simultaneously with the solidification. The mixture of chlorides so produced can be employed for various purposes, or can be further treated to form other products therefrom.

I claim:—

1. The method of chlorinating ferrochrome which comprises subjecting it to the action of a regulated current of gaseous chlorine in the presence of a fused bath of ferrous and chromous chlorides.

2. The method of chlorinating ferrochrome which comprises subjecting it to the action of a regulated current of gaseous chlorine at a temperature such that chromous and ferrous chlorides will be produced and maintained in a fused state during the further chlorination.

3. The method of chlorinating ferrochrome which comprises subjecting it to the action of a regulated current of gaseous chlorine in the presence of a fused bath of ferrous and chromous chlorides at a temperature in excess of about 800° C.

4. The method of chlorinating ferrochrome which comprises subjecting a mixture of ferrochrome and a fused bath of ferrous and chromous chlorides to agitation and to the action of chlorine.

In testimony whereof I affix my signature.

FRANK S. LOW.

CERTIFICATE OF CORRECTION.

Patent No. 1,814,393.  Granted July 14, 1931, to

FRANK S. LOW.

It is hereby certified that error appears in the printed specification of the above numbered patent requiring correction as follows: Page 2, line 9, claim 4, before "chlorine" insert the words "a regulated current of gaseous"; and that the said Letters Patent should be read with this correction therein that the same may conform to the record of the case in the Patent Office.

Signed and sealed this 1st day of September, A. D. 1931.

(Seal)

M. J. Moore,
Acting Commissioner of Patents.